United States Patent
Jang

(10) Patent No.: US 11,394,028 B2
(45) Date of Patent: Jul. 19, 2022

(54) GRAPHENE-CARBON HYBRID FOAM-PROTECTED ANODE ACTIVE MATERIAL COATING FOR LITHIUM-ION BATTERIES

(71) Applicant: Nanotek Instruments, Inc., Dayton, OH (US)

(72) Inventor: Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 99 days.

(21) Appl. No.: 16/252,814

(22) Filed: Jan. 21, 2019

(65) Prior Publication Data
US 2020/0235392 A1  Jul. 23, 2020

(51) Int. Cl.
*H01M 4/587* (2010.01)
*H01M 10/0525* (2010.01)
*H01M 4/02* (2006.01)

(52) U.S. Cl.
CPC ....... *H01M 4/587* (2013.01); *H01M 10/0525* (2013.01); *H01M 2004/021* (2013.01); *H01M 2004/027* (2013.01)

(58) Field of Classification Search
CPC ...... H01M 4/366; H01M 4/587; H01M 4/625; H01M 10/0525; H01M 2004/021; H01M 2004/027; Y03E 60/10
See application file for complete search history.

(56) References Cited

U.S. PATENT DOCUMENTS

| | | |
|---|---|---|
| 7,071,258 B1 | 7/2006 | Jang et al. |
| 9,597,657 B1 | 3/2017 | Zhamu et al. |
| 2005/0271574 A1 | 12/2005 | Jang et al. |
| 2008/0048152 A1 | 2/2008 | Jang et al. |
| 2016/0043384 A1* | 2/2016 | Zhamu ............ H01M 4/366 429/231.4 |
| 2016/0285084 A1 | 9/2016 | Fang et al. |
| 2017/0288211 A1* | 10/2017 | Zhamu ............ H01M 4/483 |
| 2017/0352869 A1 | 12/2017 | Zhamu et al. |

FOREIGN PATENT DOCUMENTS

| | | |
|---|---|---|
| CN | 107217330 A | 9/2017 |
| KR | 101138865 B1 | 5/2012 |
| KR | 1020160111754 A | 9/2016 |
| WO | 2018067391 A1 | 4/2018 |

OTHER PUBLICATIONS

PCT/US20/14356 International Search Report and Written Opinion dated May 18, 2020, 11 pages.
U.S. Appl. No. 16/252,817 Nonfinal Office Action dated Jun. 9, 2020, 11 pages.
Veprek et al., "Organometallic Chemical Vapor Deposition of Germanium from a Cyclic Germylene, 1,3-Di-tert-butyl-1,3,2-diazagermolidin-2-ylidine" Chem. Mater. (1996) vol. 8, No. 4, pp. 825-831; DOI: 10.1021/cm9503801.

* cited by examiner

*Primary Examiner* — Anca Eoff

(57) ABSTRACT

Provided is a porous anode material structure for a lithium-ion battery, the structure comprising (A) an integral 3D graphene-carbon hybrid foam comprising multiple pores, having a pore volume $V_p$, and pore walls; and (B) coating of an anode active material, having a coating volume $V_c$, coated on surfaces of the pore walls; wherein pore walls contain single-layer or few-layer graphene sheets chemically bonded by a carbon material having a carbon material-to-graphene weight ratio from 1/200 to 1/2, and wherein the volume ratio $V_p/V_c$ is from 0.1/1.0 to 10/1.0.

12 Claims, 8 Drawing Sheets

___ 100 µm

From 1 polymer particle

___ 5 µm

GRAPHENE-CARBON HYBRID FOAM-PROTECTED ANODE ACTIVE MATERIAL COATING FOR LITHIUM-ION BATTERIES

FIELD OF THE INVENTION

The present invention relates generally to the field of lithium batteries and, in particular, to an environmentally benign and cost-effective method of producing graphene/carbon hybrid foam-supported anode active material coatings for lithium-ion batteries.

BACKGROUND OF THE INVENTION

A unit cell or building block of a lithium-ion battery is typically composed of an anode current collector, an anode or negative electrode layer (containing an anode active material responsible for storing lithium therein, a conductive additive, and a resin binder), an electrolyte and porous separator, a cathode or positive electrode layer (containing a cathode active material responsible for storing lithium therein, a conductive additive, and a resin binder), and a separate cathode current collector. The electrolyte is in ionic contact with both the anode active material and the cathode active material. A porous separator is not required if the electrolyte is a solid-state electrolyte.

The binder in the binder layer is used to bond the anode active material (e.g. graphite or Si particles) and a conductive filler (e.g. carbon black or carbon nanotube) together to form an anode layer of structural integrity, and to bond the anode layer to a separate anode current collector, which acts to collect electrons from the anode active material when the battery is discharged. In other words, in the negative electrode (anode) side of the battery, there are typically four different materials involved: an anode active material, a conductive additive, a resin binder (e.g. polyvinylidine fluoride, PVDF, or styrene-butadiene rubber, SBR), and an anode current collector (typically a sheet of Cu foil). Typically the former three materials form a separate, discrete anode layer and the latter one forms another discrete layer.

The most commonly used anode active materials for lithium-ion batteries are natural graphite and synthetic graphite (or artificial graphite) that can be intercalated with lithium and the resulting graphite intercalation compound (GIC) may be expressed as $Li_xC_6$, where x is typically less than 1. The maximum amount of lithium that can be reversibly intercalated into the interstices between graphene planes of a perfect graphite crystal corresponds to x=1, defining a theoretical specific capacity of 372 mAh/g.

Graphite or carbon anodes can have a long cycle life due to the presence of a protective solid-electrolyte interface layer (SEI), which results from the reaction between lithium and the electrolyte (or between lithium and the anode surface/edge atoms or functional groups) during the first several charge-discharge cycles. The lithium in this reaction comes from some of the lithium ions originally intended for the charge transfer purpose. As the SEI is formed, the lithium ions become part of the inert SEI layer and become irreversible, i.e. these positive ions can no longer be shuttled back and forth between the anode and the cathode during subsequent charges/discharges. Therefore, it is desirable to use a minimum amount of lithium for the formation of an effective SEI layer. In addition to SEI formation, the irreversible capacity loss $Q_{ir}$ can also be attributed to graphite exfoliation caused by electrolyte/solvent co-intercalation and other side reactions.

In addition to carbon- or graphite-based anode materials, other inorganic materials that have been evaluated for potential anode applications include metal oxides, metal nitrides, metal sulfides, and the like, and a range of metals, metal alloys, and intermetallic compounds that can accommodate lithium atoms/ions or react with lithium. Among these materials, lithium alloys having a composition formula of $Li_aA$ (A is a metal or semiconductor element, such as Al and Si, and "a" satisfies $0<a\leq5$) are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). However, as schematically illustrated in FIG. 2(A), in an anode composed of these high-capacity materials, severe pulverization (fragmentation of the alloy particles) occurs during the charge and discharge cycles due to severe expansion and contraction of the anode active material particles induced by the insertion and extraction of the lithium ions in and out of these particles. The expansion and contraction, and the resulting pulverization, of active material particles, lead to loss of contacts between active material particles and conductive additives and loss of contacts between the anode active material and its current collector. These adverse effects result in a significantly shortened charge-discharge cycle life.

To overcome the problems associated with such mechanical degradation, three technical approaches have been proposed:

(1) reducing the size of the active material particle, presumably for the purpose of reducing the total strain energy that can be stored in a particle, which is a driving force for crack formation in the particle. However, a reduced particle size implies a higher surface area available for potentially reacting with the liquid electrolyte to form a higher amount of SEI. Such a reaction is undesirable since it is a source of irreversible capacity loss.

(2) depositing the electrode active material in a thin film form directly onto a current collector, such as a copper foil. However, such a thin film structure with an extremely small thickness-direction dimension (typically much smaller than 500 nm, often necessarily thinner than 100 nm) implies that only a small amount of active material can be incorporated in an electrode (given the same electrode or current collector surface area), providing a low total lithium storage capacity and low lithium storage capacity per unit electrode surface area (even though the capacity per unit mass can be large). Such a thin film must have a thickness less than 100 nm to be more resistant to cycling-induced cracking, further diminishing the total lithium storage capacity and the lithium storage capacity per unit electrode surface area. Such a thin-film battery has very limited scope of application. A desirable and typical electrode thickness is from 100 μm to 200 μm. These thin-film electrodes (with a thickness of <500 nm or even <100 nm) fall short of the required thickness by three (3) orders of magnitude, not just by a factor of 3.

(3) using a composite composed of small electrode active particles protected by (dispersed in or encapsulated by) a less active or non-active matrix, e.g., carbon-coated Si particles, sol gel graphite-protected Si, metal oxide-coated Si or Sn, and monomer-coated Sn nanoparticles. Presumably, the protective matrix provides a cushioning effect for particle expansion or shrinkage, and prevents the electrolyte from contacting and reacting with the electrode active material. Examples of high-capacity anode active particles are Si, Sn, and $SnO_2$. Unfortunately, when an active material particle, such as Si particle, expands (e.g. up to a volume expansion of 380%) during the battery charge step, the protective coating is easily broken due to the mechanical weakness and/o brittleness of the protective coating materials. There has been no high-strength and high-toughness material available that is itself also lithium ion conductive.

It may be further noted that the coating or matrix materials used to protect active particles (such as Si and Sn) are carbon, sol gel graphite, metal oxide, monomer, ceramic, and lithium oxide. These protective materials are all very brittle, weak (of low strength), and/or non-conductive to lithium ions (e.g., ceramic or oxide coating). Ideally, the protective material should meet the following requirements: (a) The protective material must be lithium ion-conducting as well as initially electron-conducting (when the anode electrode is made) and be capable of preventing liquid electrolyte from being in constant contact with the anode active material particles (e.g. Si). (b) The protective material should also have high fracture toughness or high resistance to crack formation to avoid disintegration during cycling. (c) The protective material must be inert (inactive) with respect to the electrolyte, but be a good lithium ion conductor. (d) The protective material must not provide any significant amount of defect sites that irreversibly trap lithium ions. (e) The combined protective material-anode material structure must allow for an adequate amount of free space to accommodate volume expansion of the anode active material particles when lithiated. The prior art protective materials all fall short of these requirements. Hence, it was not surprising to observe that the resulting anode typically shows a reversible specific capacity much lower than expected. In many cases, the first-cycle efficiency is extremely low (mostly lower than 80% and some even lower than 60%). Furthermore, in most cases, the electrode was not capable of operating for a large number of cycles. Additionally, most of these electrodes are not high-rate capable, exhibiting unacceptably low capacity at a high discharge rate.

Due to these and other reasons, most of prior art composite electrodes and electrode active materials have deficiencies in some ways, e.g., in most cases, less than satisfactory reversible capacity, poor cycling stability, high irreversible capacity, ineffectiveness in reducing the internal stress or strain during the lithium ion insertion and extraction steps, and other undesirable side effects.

In summary, the prior art has not demonstrated a material that has all or most of the properties desired for use as an anode active material in a lithium-ion battery. Thus, there is an urgent and continuing need for a new anode active material that enables a lithium-ion battery to exhibit a high cycle life, high reversible capacity, low irreversible capacity, small particle sizes (for high-rate capacity), and compatibility with commonly used electrolytes. There is also a need for a method of readily or easily producing such a material in large quantities.

Carbon is known to have five unique crystalline structures, including diamond, fullerene (0-D nanographitic material), carbon nanotube or carbon nanofiber (1-D nanographitic material), graphene (2-D nanographitic material), and graphite (3-D graphitic material). The carbon nanotube (CNT) refers to a tubular structure grown with a single wall or multi-wall. Carbon nanotubes (CNTs) and carbon nanofibers (CNFs) have a diameter on the order of a few nanometers to a few hundred nanometers. Their longitudinal, hollow structures impart unique mechanical, electrical and chemical properties to the material. The CNT or CNF is a one-dimensional nanocarbon or 1-D nanographite material.

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004) (U.S. Pat. Pub. No. 2005/0271574); and (3) B. Z. Jang, A. Zhamu, and J. Guo, "Process for Producing Nano-scaled Platelets and Nanocomposites," U.S. patent application Ser. No. 11/509,424 (Aug. 25, 2006) (U.S. Pat. Pub. No. 2008/0048152).

A single-layer graphene sheet is composed of carbon atoms occupying a two-dimensional hexagonal lattice. Multi-layer graphene is a platelet composed of more than one graphene plane. Individual single-layer graphene sheets and multi-layer graphene platelets are herein collectively called nanographene platelets (NGPs) or graphene materials.

For the purpose of defining the claims of the instant application, NGPs or graphene materials include discrete sheets/platelets of single-layer and multi-layer (typically less than 10 layers) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials.

It is an object of the present invention to provide a graphene/carbon foam-protected anode active material coating and a cost-effective process for producing highly conductive, mechanically robust graphene-based foams (specifically, integral 3D graphene-carbon hybrid foam) that can support and protect an anode active material coating bonded to pore walls in the foam. This process does not involve the use of an environmentally unfriendly chemical. This process enables the flexible design and control of the porosity level and pore sizes to accommodate anode active material coating that are essential to achieving charge/discharge cycling stability of a lithium-ion battery.

SUMMARY OF THE INVENTION

The present invention provides a porous anode material structure for a lithium-ion battery, the structure comprising (A) an integral 3D graphene-carbon hybrid foam comprising multiple pores (having a pore volume $V_p$) and pore walls; and (B) a coating of an anode active material (having a coating volume $V_c$) coated on surfaces of the pore walls; wherein the pore walls contain single-layer or few-layer graphene sheets chemically bonded by a carbon material having a carbon material-to-graphene weight ratio from 1/200 to 1/2, and wherein the volume ratio $V_p/V_c$ is from 0.1/1.0 to 10/1.0. The volume ratio $V_p/V_c$ is preferably from 0.3/1.0 to 4.0/1.0, and further preferably from 0.5/1.0 to 3.8/1.0. The thickness of the anode material coating may be varied from 1 nm to 20 µm (preferably <5 µm, more preferably <1 µm, further more preferably <500 nm, and most preferably <100 nm). The active material coating amount is typically from 1% to 99% by weight, more typically from 5% to 95% by weight, and further more preferably or typically from 10% to 90% by weight).

By a commonly accepted definition, the few-layer graphene has 2-10 layers of stacked graphene planes. The few-layer graphene in the presently invented porous anode material structure have an inter-plane spacing $d_{002}$ from 0.3354 nm to 0.40 nm as measured by X-ray diffraction. The single-layer or few-layer graphene sheets contain a pristine graphene material having essentially zero % of non-carbon elements, or a non-pristine graphene material having 0.001% to 25% by weight of non-carbon elements wherein said non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

In certain embodiments, the porous anode material structure is in a layer form having a thickness from 10 μm to 1 mm. There is no limitation on the width or length of the layer, but can be from 5 mm to 5 m for practical uses. The porous anode material structure may be in a continuous-length roll sheet form having a thickness from 10 μm to 10 cm and a length of at least 2 meters. This can be produced by a roll-to-roll process.

In some embodiments, the porous anode material structure is in a porous particulate form having multiple pores and pore walls coated with the anode active material coating, and the porous particulate has a diameter from 5 μm to 50 μm.

Preferably the integral 3D graphene-carbon hybrid foam is an open-cell foam containing multiple pores that are interconnected to form open cells that are more conducive to the entry of the coating or its precursor material. The anode active material (e.g. Si vapor) or a precursor solution (e.g. tin chloride and aluminum sulfate, etc.) can infiltrate or impregnate into substantially all the pores in this porous graphene-carbon hybrid foam structure, and adhere to pore wall surfaces (e.g. chemically bonded to graphene surfaces). The precursor is then thermally and/or chemically converted into the anode active material (e.g. Sn or Al coating) coated on pore walls.

The pore walls may contain a non-pristine graphene material, wherein the foam contains a content of non-carbon elements in the range from 0.01% to 20% by weight and the non-carbon elements include an element selected from oxygen, fluorine, chlorine, bromine, iodine, nitrogen, hydrogen, or boron. In certain embodiments, the pore walls contain graphene fluoride and the solid graphene foam contains a fluorine content from 0.01% to 15% by weight. In certain other embodiments, the pore walls contain graphene oxide and the solid graphene foam contains an oxygen content from 0.01% to 20% by weight.

In the porous anode material structure, the pore walls typically contain a 3D network of interconnected graphene planes. The foam may contain mesoscaled pores having a pore size from 2 nm to 100 nm. Preferably, the structure contains pores in the size range from 100 nm to 100 μm but preferably smaller than 50 μm, and further preferably smaller than 10 μm.

The anode active material coating is preferably selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide; (f) prelithiated versions thereof; (g) particles of Li, Li alloy, or surface-stabilized Li having at least 60% by weight of lithium element therein; and (h) combinations thereof. The Li alloy typically contains from 0.1% to 10% by weight of a metal element selected from Zn, Ag, Au, Mg, Ni, Ti, Fe, Co, V, or a combination.

In certain embodiments, the anode active material contains a prelithiated Si, prelithiated Ge, prelithiated Sn, prelithiated $SnO_x$, prelithiated $SiO_x$, prelithiated iron oxide, prelithiated $VO_2$, prelithiated $Co_3O_4$, prelithiated $Ni_3O_4$, lithium titanate, or a combination thereof, wherein x=1 to 2.

In the porous anode material structure, the coating of anode active material may be further coated with (or covered by) a layer of carbon or a conducting polymer. The carbon can be an amorphous carbon, chemical vapor deposition carbon, or a polymeric carbon (carbon derived from carbonized resin or pitch). The conductive polymer may be selected from any electronically conductive polymer (e.g. polyaniline, polypyrrole, polythiophene, polyfuran, a bi-cyclic polymer, a sulfonated derivative thereof, or a combination thereof), The invention also provides a battery anode containing the porous anode material structure described above as an anode active material. Also provided is a battery containing such a battery anode and this battery can be a lithium-ion battery, lithium metal battery, lithium-sulfur battery, lithium-air battery, or lithium-selenium battery.

The present invention also provides a method of producing a porous anode material structure for a lithium-ion battery, the method comprising (A) providing an integral 3D graphene-carbon hybrid foam comprising multiple pores, having a pore volume Vp, and pore walls; and (B) impregnating or infiltrating the pores with a fluid for forming a coating of an anode active material, having a coating volume Vc, on surfaces of the pore walls; wherein the pore walls contain single-layer or few-layer graphene sheets chemically bonded by a carbon material having a carbon material-to-graphene weight ratio from 1/200 to 1/2, and wherein the volume ratio Vp/Vc is from 0.1/1.0 to 10/1.0.

Step (B) of impregnating or infiltrating said pores with a fluid may include an operation or procedure selected from chemical vapor deposition, physical vapor deposition, solution infiltration, melt infiltration, or a combination thereof.

Step (B) may be followed by a step of introducing a conducting polymer or carbon into the pores wherein the conducting polymer or carbon is deposited onto a surface of the coating of anode active material, providing protection thereto.

For Step (A), the integral 3D graphene-carbon hybrid foam may be produced directly from particles of a graphitic material and particles of a polymer. This procedure of producing 3D graphene-carbon hybrid foam is stunningly simple, typically comprising:

(a) mixing multiple particles of a graphitic material and multiple particles of a solid polymer carrier material (optionally along with impacting media or ball-milling media, such as zirconia balls or stainless steel balls) to form a mixture in an impacting chamber of an energy impacting apparatus;

(b) operating this energy impacting apparatus with a frequency and an intensity for a length of time sufficient for peeling off graphene sheets from the graphitic material and transferring the graphene sheets to surfaces of the solid polymer carrier material particles to produce graphene-coated polymer particles inside the impacting chamber; (e.g. The impacting apparatus, when in operation, imparts kinetic energy to polymer particles, which in turn impinge upon graphite particle surfaces/edges and peel off graphene sheets from the impacted graphite particles. These peeled-off graphene sheets stick to surfaces of these polymer particles. This is herein referred to as the "direct transfer" process, meaning that graphene sheets are directly transferred from graphite particles to surfaces of polymer particles without being mediated by any third-party entity such as ball-milling media.)

(c) recovering the graphene-coated polymer particles from the impacting chamber and consolidating the graphene-coated polymer particles into a desired shape of graphene-polymer hybrid structure (this consolidating step can be as simple as a compacting step that just packs graphene-coated or embedded particles into a desired shape); and (d) pyrolyzing this shape of graphene-polymer hybrid structure to thermally convert the polymer into pores and carbon or graphite that bonds the graphene sheets to form the integral 3D graphene-carbon hybrid foam.

In certain alternative embodiments, a plurality of impacting balls or media are added to the impacting chamber of the energy impacting apparatus. These impacting balls, accelerated by the impacting apparatus, impact the surfaces/edges of graphite particles and peel off graphene sheets therefrom. These graphene sheets are tentatively transferred to surfaces of these impacting balls. These graphene-supporting impacting balls subsequently impinge upon polymer particles and transfer the supported graphene sheets to the surfaces of these polymer particles. This sequence of events is herein referred to as the "indirect transfer" process. In some embodiments of the indirect transfer process, step (c) includes operating a magnet to separate the impacting balls or media from the graphene-coated polymer particles.

The solid polymer material particles can include plastic or rubber beads, pellets, spheres, wires, fibers, filaments, discs, ribbons, or rods, having a diameter or thickness from 10 nm to 10 mm. Preferably, the diameter or thickness is from 100 nm to 1 mm, and more preferably from 200 nm to 200 μm. The solid polymer may be selected from solid particles of a thermoplastic, thermoset resin, rubber, semi-penetrating network polymer, penetrating network polymer, natural polymer, or a combination thereof. In an embodiment, the solid polymer is partially removed by melting, etching, or dissolving in a solvent prior to step (d).

In certain embodiments, the graphitic material is selected from natural graphite, synthetic graphite, highly oriented pyrolytic graphite, graphite fiber, graphitic nanofiber, graphite fluoride, oxidized graphite, chemically modified graphite, exfoliated graphite, recompressed exfoliated graphite, expanded graphite, mesocarbon microbead, or a combination thereof. Preferably, the graphitic material contains a non-intercalated and non-oxidized graphitic material that has never been previously exposed to a chemical or oxidation treatment prior to the mixing step (a).

The applicant has surprisingly observed that a broad array of impacting devices can be used for practicing the instant invention. For instance, the energy impacting apparatus can be a vibratory ball mill, planetary ball mill, high energy mill, basket mill, agitator ball mill, cryo ball mill, microball mill, tumbler ball mill, attritor, continuous ball mill, stirred ball mill, pressurized ball mill, freezer mill, vibratory sieve, bead mill, nanobead mill, ultrasonic homogenizer mill, centrifugal planetary mixer, vacuum ball mill, or resonant acoustic mixer.

For the formation of the carbon component of the resulting graphene-carbon hybrid foam, one can choose polymer particles that have a high carbon yield or char yield (e.g. >30% by weight). The carbon yield is the weight percentage of a polymer structure that is converted by heat to a solid carbon phase, instead of becoming part of a volatile gas. The high carbon-yield polymer may be selected from phenolic resin, poly furfuryl alcohol, polyacrylonitrile, polyimide, polyamide, polyoxadiazole, polybenzoxazole, polybenzobisoxazole, polythiazole, polybenzothiazole, polybenzobisthiazole, poly(p-phenylene vinylene), polybenzimidazole, polybenzobisimidazole, a copolymer thereof, a polymer blend thereof, or a combination thereof.

If a lower carbon content (higher graphene proportion) is desired in the graphene-carbon hybrid foam, the polymer can contain a low carbon-yield polymer selected from polyethylene, polypropylene, polybutylene, polyvinyl chloride, polycarbonate, acrylonitrile-butadiene (ABS), polyester, polyvinyl alcohol, poly vinylidene fluoride (PVDF), polytetrafluoroethylene (PTFE), polyphenylene oxide (PPO), poly methyl methacrylate (PMMA), a copolymer thereof, a polymer blend thereof, or a combination thereof.

It may be noted that these polymers (both high and low carbon yields), when heated at a temperature of 300-2,500° C., are converted into a carbon material, which is preferentially nucleated near graphene sheet edges. Such a carbon material serves to bridge the gaps between graphene sheets, forming interconnected electron-conducting pathways. In other words, the resulting graphene-carbon hybrid foam is composed of integral 3D network of carbon-bonded graphene sheets, allowing continuous transport of electrons and phonons (quantized lattice vibrations) between graphene sheets or domains without interruptions. When further heated at a temperature higher than 2,500° C., the graphene-bonding carbon phase can get graphitized provided that the carbon phase is "soft carbon" or graphitizable. In such a situation, both the electric conductivity and thermal conductivity are further increased.

Thus, in certain embodiments, the step of pyrolyzing includes carbonizing the polymer at a temperature from 200° C. to 2,500° C. to obtain carbon-bonded graphene sheets. Optionally, the carbon-bonded graphene sheets can be subsequently graphitized at a temperature from 2,500° C. to 3,200° C. to obtain graphite-bonded graphene sheets.

It may be noted that pyrolyzation of a polymer tends to lead to the formation of pores in the resulting polymeric carbon phase due to the evolution of those volatile gas molecules such as $CO_2$ and $H_2O$. However, such pores also have a high tendency to get collapsed if the polymer is not constrained when being carbonized. We have surprisingly discovered that the graphene sheets wrapped around a polymer particle are capable of constraining the carbon pore walls from being shrunk and collapsed, while some carbon species also permeate to the gaps between graphene sheets where these species bond the graphene sheets together. The pore sizes and pore volume (porosity level) of the resulting 3D integral graphene foam depend upon the starting polymer size and the carbon yield of the polymer and, to a lesser extent, on the pyrolyzation temperature.

In certain preferred embodiments, the consolidating step includes compacting a mass of these graphene-coated polymer particles into a desired shape. For instance, by squeezing and compressing the mass of graphene-coated particles into a mold cavity one can readily form a compact green body. One can rapidly heat and melt the polymer, slightly compress the green body to slightly fuse the polymer particles together by heat, and rapidly cool to solidify the body. This consolidated body is then subjected to a pyrolysis treatment (polymer carbonization and, optionally, graphitization).

In some alternative embodiments, the consolidating step includes melting the polymer particles to form a polymer melt mixture with graphene sheets dispersed therein, forming the polymer melt mixture into a desired shape and solidifying the shape into a graphene-polymer composite structure. Such shape can be a rod, film (thin or thick film, wide or narrow, single sheets or in a roll), fiber (short filament or continuous long filament), plate, ingot, any regular shape or odd shape. This graphene-polymer composite shape is then pyrolyzed Alternatively, the consolidating step may include dissolving the polymer particles in a solvent to form a polymer solution mixture with graphene sheets dispersed therein, forming the polymer solution mixture into a desired shape, and removing the solvent to solidify the shape into the graphene-polymer composite structure. This composite structure is then pyrolyzed to form a porous structure.

The consolidating step may include melting the polymer particles to form a polymer melt mixture with graphene sheets dispersed therein and extruding the mixture into a rod form or sheet form, spinning the mixture into a fiber form, spraying the mixture into a powder form, or casting the mixture into an ingot form.

In some embodiments, the consolidating step includes dissolving the polymer particles in a solvent to form a polymer solution mixture with graphene sheets dispersed therein and extruding the solution mixture into a rod form or sheet form, spinning the solution mixture into a fiber form, spraying the solution mixture into a powder form, or casting the solution mixture into an ingot form, and removing the solvent.

In a specific embodiment, the polymer solution mixture is sprayed to create a graphene-polymer composite coating or film, which is then pyrolyzed (carbonized or carbonized and graphitized).

Preferably, the consolidating step may include compacting the graphene-coated polymer particles in a porous green compact having macroscopic pores and then infiltrate or impregnate the pores with an additional carbon source material selected from a petroleum pitch, coal tar pitch, an aromatic organic material (e.g. naphthalene or other derivatives of a pitch), a monomer, an organic polymer, or a combination thereof. The organic polymer may contain a high carbon-yield polymer selected from phenolic resin, poly furfuryl alcohol, polyacrylonitrile, polyimide, polyamide, polyoxadiazole, polybenzoxazole, polybenzobisoxazole, polythiazole, polybenzothiazole, polybenzobisthiazole, poly(p-phenylene vinylene), polybenzimidazole, polybenzobisimidazole, a copolymer thereof, a polymer blend thereof, or a combination thereof. When the infiltrated green compact of graphene-coated polymer particles is subjected to pyrolyzation, these species become additional sources of carbon, if a higher amount of carbon in the hybrid foam is desired.

The integral 3D graphene-carbon hybrid foam produced is typically composed of multiple pores and pore walls, wherein the pore walls contain single-layer or few-layer graphene sheets chemically bonded by a carbon material having a carbon material-to-graphene weight ratio from 1/200 to 1/2, wherein the few-layer graphene sheets have 2-10 layers of stacked graphene planes having an inter-plane spacing $d_{002}$ from 0.3354 nm to 0.36 nm as measured by X-ray diffraction and the single-layer or few-layer graphene sheets contain a pristine graphene material having essentially zero % of non-carbon elements, or a non-pristine graphene material having 0.001% to 35% by weight (preferably 0.01% to 25%) of non-carbon elements wherein the non-pristine graphene is selected from graphene oxide, reduced graphene oxide, graphene fluoride, graphene chloride, graphene bromide, graphene iodide, hydrogenated graphene, nitrogenated graphene, chemically functionalized graphene, or a combination thereof. A plurality of single-layer or few layer graphene embracing the underlying polymer particles can overlap with one another to form a stack of graphene sheets. The stack can have a thickness greater than 5 nm and, in some cases, greater than 10 nm or even greater than 100 nm.

The integral 3D graphene-carbon hybrid foam, prior to anode coating, typically has a density from 0.001 to 1.7 g/cm³ (but more typically <1.0 g/cm³, and further more typically <0.5 g/cm³), and a specific surface area from 50 to 3,000 m²/g. In a preferred embodiment, the pore walls contain stacked graphene planes having an inter-planar spacing $d_{002}$ from 0.3354 nm to 0.40 nm as measured by X-ray diffraction.

In an embodiment, the pore walls contain pristine graphene and the 3D solid graphene-carbon foam has a density from 0.001 to 1.7 g/cm³ or an average pore size from 2 nm to 100 nm. However, the pore sizes are preferably from 100 nm to 100 μm, and more preferably from 1 μm to 20 μm. These pores are preferably interconnected to enable easy entry or flow of an anode active material or its precursor in a fluid form. In an embodiment, the pore walls contain a non-pristine graphene material selected from the group consisting of graphene oxide, reduced graphene oxide, graphene fluoride, graphene chloride, graphene bromide, graphene iodide, hydrogenated graphene, nitrogenated graphene, chemically functionalized graphene, and combinations thereof, and wherein the solid graphene foam contains a content of non-carbon elements in the range from 0.01% to 20% by weight. In other words, the non-carbon elements can include an element selected from oxygen, fluorine, chlorine, bromine, iodine, nitrogen, hydrogen, or boron. In a specific embodiment, the pore walls contain graphene fluoride and the solid graphene foam contains a fluorine content from 0.01% to 20% by weight. In another embodiment, the pore walls contain graphene oxide and said solid graphene foam contains an oxygen content from 0.01% to 20% by weight. In an embodiment, the solid graphene-carbon hybrid foam has a specific surface area from 200 to 2,000 m²/g or a density from 0.01 to 1.5 g/cm³.

It may be noted that there are no limitations on the shape or dimensions of the presently invented graphene-carbon hybrid foam. In a preferred embodiment, the solid graphene-carbon hybrid foam is made into a continuous-length roll sheet form (a roll of a continuous foam sheet) having a thickness no less than 100 nm and no greater than 10 cm and a length of at least 1 meter long, preferably at least 2 meters, further preferably at least 10 meters, and most preferably at least 100 meters. This sheet roll is produced by a roll-to-roll process. There has been no prior art graphene-based foam that is made into a sheet roll form. It has not been previously found or suggested possible to have a roll-to-roll process for producing a continuous length of graphene foam, either pristine or non-pristine based.

The graphene-carbon foam preferably has an oxygen content or non-carbon content less than 1% by weight, and the pore walls have stacked graphene planes having an inter-graphene spacing less than 0.35 nm, a thermal conductivity of at least 250 W/mK per unit of specific gravity, and/or an electrical conductivity no less than 2,500 S/cm per unit of specific gravity.

In a further preferred embodiment, the graphene-carbon hybrid foam has an oxygen content or non-carbon content less than 0.01% by weight and said pore walls contain stacked graphene planes having an inter-graphene spacing less than 0.34 nm, a thermal conductivity of at least 300 W/mK per unit of specific gravity, and/or an electrical conductivity no less than 3,000 S/cm per unit of specific gravity.

In yet another preferred embodiment, the graphene-carbon hybrid foam has an oxygen content or non-carbon content no greater than 0.01% by weight and said pore walls contain stacked graphene planes having an inter-graphene spacing less than 0.336 nm, a mosaic spread value no greater than 0.7, a thermal conductivity of at least 350 W/mK per unit of specific gravity, and/or an electrical conductivity no less than 3,500 S/cm per unit of specific gravity.

In still another preferred embodiment, the graphene-carbon foam has pore walls containing stacked graphene planes having an inter-graphene spacing less than 0.336 nm, a mosaic spread value no greater than 0.4, a thermal conductivity greater than 400 W/mK per unit of specific gravity, and/or an electrical conductivity greater than 4,000 S/cm per unit of specific gravity.

In a preferred embodiment, the pore walls contain stacked graphene planes having an inter-graphene spacing less than 0.337 nm and a mosaic spread value less than 1.0. In a preferred embodiment, the graphene foam exhibits a degree of graphitization no less than 80% (preferably no less than 90%) and/or a mosaic spread value less than 0.4. In a preferred embodiment, the pore walls contain a 3D network of interconnected graphene planes.

In a preferred embodiment, the solid graphene-carbon hybrid foam contains mesoscaled pores having a pore size from 2 nm to 100 nm. The solid graphene foam can also be made to contain micron-scaled pores (e.g. 1-500 µm).

DESCRIPTION OF THE PREFERRED EMBODIMENTS

A lithium-ion battery cell is typically composed of an anode current collector (e.g. Cu foil), an anode or negative electrode active material layer (i.e. anode layer typically containing particles of an anode active material, conductive additive, and binder), a porous separator and/or an electrolyte component, a cathode or positive electrode active material layer (containing a cathode active material, conductive additive, and resin binder), and a cathode current collector (e.g. Al foil). More specifically, the anode layer is composed of particles of an anode active material (e.g. graphite, Sn, $SnO_2$, or Si), a conductive additive (e.g. carbon black particles), and a resin binder (e.g. SBR or PVDF). This anode layer is typically 50-300 µm thick (more typically 100-200 µm) to give rise to a sufficient amount of current per unit electrode area.

Figure 1A:
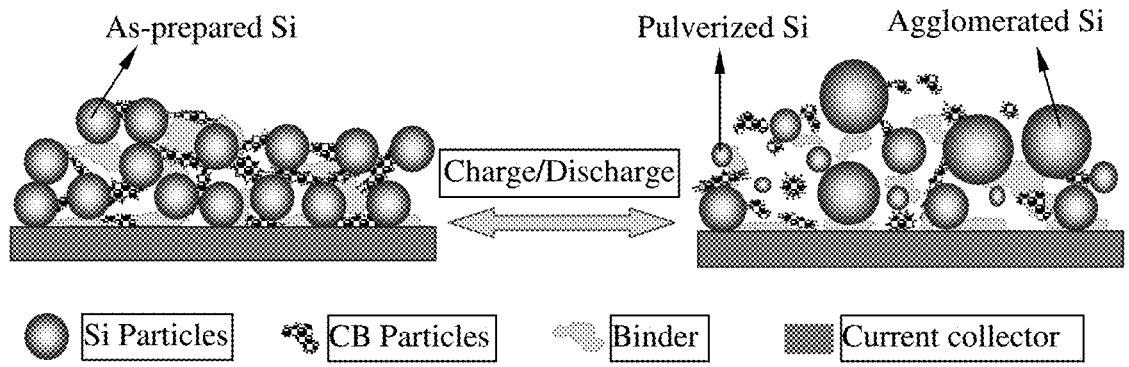
FIG. 1(A) Schematic illustrating the notion that expansion of Si particles, upon lithium intercalation during charging of a prior art lithium-ion battery, can lead to pulverization of Si particles, interruption of the conductive paths formed by the conductive additive, and loss of contact with the current collector.

In order to obtain a higher energy density cell, the anode can be designed to contain higher-capacity anode active materials having a composition formula of $Li_aA$ (A is a metal or semiconductor element, such as Al and Si, and "a" satisfies $0<a\leq5$). These materials are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). However, as discussed in the Background section, there are several problems associated with the implementation of these high-capacity anode active materials:

1) As schematically illustrated in FIG. 1(A), in an anode composed of these high-capacity materials, severe pulverization (fragmentation of the alloy particles) occurs during the charge and discharge cycles due to severe expansion and contraction of the anode active material particles induced by the insertion and extraction of the lithium ions in and out of these particles. The expansion and contraction, and the resulting pulverization, of active material particles, lead to loss of contacts between active material particles and conductive additives and loss of contacts between the anode active material and its current collector. These adverse effects result in a significantly shortened charge-discharge cycle life.

2) The approach of using a composite composed of small electrode active particles protected by (dispersed in or encapsulated by) a less active or non-active matrix, e.g., carbon-coated Si particles, sol gel graphite-protected Si, metal oxide-coated Si or Sn, and monomer-coated Sn nanoparticles, has failed to overcome the capacity decay problem. Presumably, the protective matrix provides a cushioning effect for particle expansion or shrinkage, and prevents the electrolyte from contacting and reacting with the electrode active material. Unfortunately, when an active material particle, such as Si particle, expands (e.g. up to a volume expansion of 380%) during the battery charge step, the protective coating is easily broken due to the mechanical weakness and/or brittleness of the protective coating materials. There has been no high-strength and high-toughness material available that is itself also lithium ion conductive.

3) The approach of using a core-shell structure (e.g. Si nanoparticle encapsulated in a carbon or $SiO_2$ shell) also has not solved the capacity decay issue. As illustrated in upper portion of FIG. 1(B), a non-lithiated Si particle can be encapsulated by a carbon shell to form a core-shell structure (Si core and carbon or $SiO_2$ shell in this example). As the lithium-ion battery is charged, the anode active material (carbon- or $SiO_2$-encapsulated Si particle) is intercalated with lithium ions and, hence, the Si particle expands. Due to the brittleness of the encapsulating shell (carbon), the shell is broken into segments, exposing the underlying Si to electrolyte and subjecting the Si to undesirable reactions with electrolyte during repeated charges/discharges of the battery. These reactions continue to consume the electrolyte and reduce the cell's ability to store lithium ions.

Figure 1B:
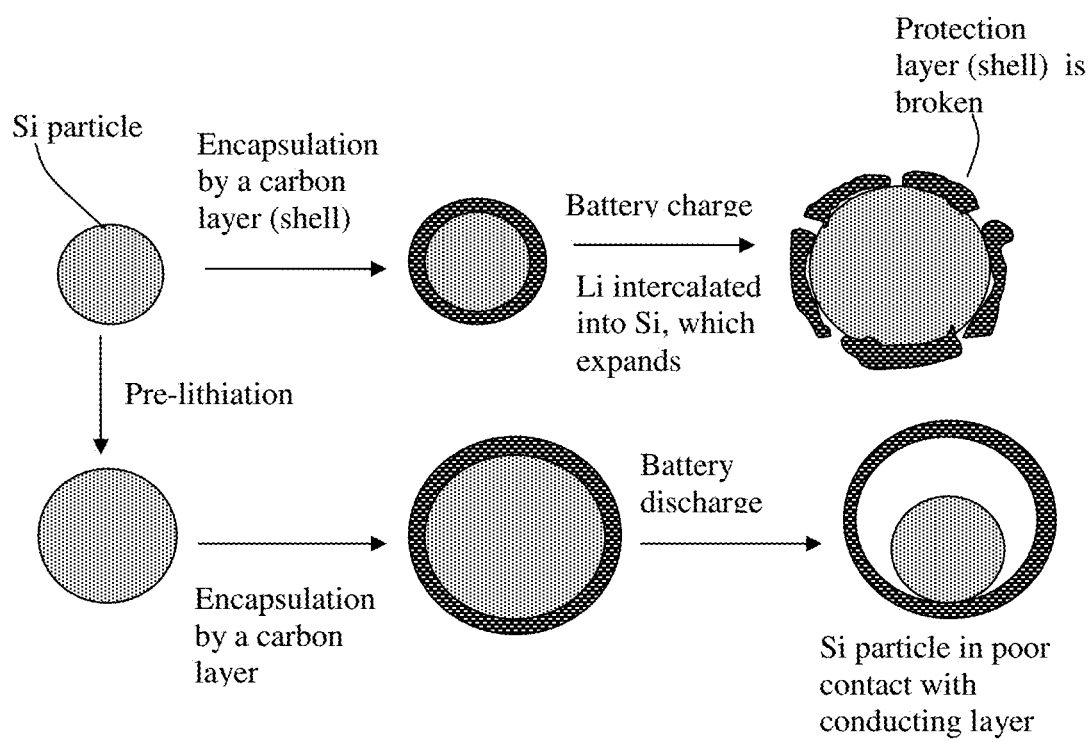
FIG. 1(B) Illustration of some issues associated with prior art anode active material; for instance, a non-lithiated Si particle encapsulated by a protective shell (e.g. carbon shell) in a core-shell structure inevitably leads to breakage of the shell and that a prelithiated Si particle encapsulated with a protective layer leads to poor contact between the contracted Si particle and the rigid protective shell during battery discharge.

4) Referring to the lower portion of FIG. 1(B), wherein the Si particle has been prelithiated with lithium ions; i.e. has been pre-expanded in volume. When a layer of carbon (as an example of a protective material) is encapsulated around the prelithiated Si particle, another core-shell structure is formed. However, when the battery is discharged and lithium ions are released (de-intercalated) from the Si particle, the Si particle contracts, leaving behind a large gap between the protective shell and the Si particle. Such a configuration is not conducive to lithium intercalation of the Si particle during the subsequent battery charge cycle due to the gap and the poor contact of Si particle with the protective shell (through which lithium ions can diffuse). This would significantly curtail the lithium storage capacity of the Si particle particularly under high charge rate conditions.

In other words, there are several conflicting factors that must be considered concurrently when it comes to the design and selection of an anode active material in terms of material type, shape, size, porosity, and electrode layer thickness. Thus far, there has been no effective solution offered by any prior art teaching to these conflicting problems.

We have solved these challenging issues that have troubled battery designers and electrochemists alike for more than 30 years by developing the approach of graphene-carbon foam-supported anode material coating. The pores in the graphene-carbon foam can accommodate the volume expansion of the coating of the anode active material. The presence of graphene-based graphene pore walls provides a 3D network of electron-conducting pathways while the pores allow for volume expansion of the anode active material coating (e.g. Si and $SiO_x$ particles, $0<x<2.0$).

In certain embodiments, the present invention provides a porous anode material structure for a lithium-ion battery, the structure comprising (A) an integral 3D graphene-carbon hybrid foam comprising multiple pores (having a pore volume Vp) and pore walls; and (B) a coating of an anode active material (having a coating volume Vc) coated on surfaces of the pore walls; wherein the pore walls contain single-layer or few-layer graphene sheets chemically bonded by a carbon material having a carbon material-to-graphene weight ratio from 1/200 to 1/2, and wherein the volume ratio Vp/Vc is from 0.1/1.0 to 10/1.0. The volume ratio Vp/Vc is preferably from 0.3/1.0 to 4.0/1.0, further preferably from 0.5/1.0 to 3.8/1.0. The thickness of the anode material coating may be varied from 1 nm to 20 μm (preferably <5 μm, more preferably <1 μm, further more preferably <500 nm, and most preferably <100 nm). The active material coating amount is typically from 1% to 99% by weight, more typically from 5% to 95% by weight, and further more preferably or typically from 10% to 90% by weight).

In certain embodiments, the porous anode material structure is in a layer form having a thickness from 10 μm to 1 mm. There is no limitation on the width or length of the layer, but can be from 5 mm to 5 m for practical uses. The porous anode material structure may be in a continuous-length roll sheet form having a thickness from 10 μm to 10 cm and a length of at least 2 meters and this is produced by a roll-to-roll process.

In some embodiments, the porous anode material structure is in a porous particulate form having multiple pores and pore walls coated with the anode active material coating, and the porous particulate has a diameter from 5 μm to 50 μm.

Preferably the integral 3D graphene-carbon hybrid foam is an open-cell foam containing multiple pores that are interconnected to form open cells for accommodating the entry of the coating or its precursor material. The anode active material (e.g. Si vapor) or a precursor solution (e.g. tine chloride and aluminum sulfate, etc.) can infiltrate or impregnate into substantially all the pores in this porous graphene-carbon structure, and adhere to pore wall surfaces (e.g. chemically bonded to graphene surfaces). The precursor is then thermally and/or chemically converted into the anode active material (e.g. Sn or Al coating) coated on pore walls.

The pore walls may contain a non-pristine graphene material, wherein the foam contains a content of non-carbon elements in the range from 0.01% to 20% by weight and the non-carbon elements include an element selected from oxygen, fluorine, chlorine, bromine, iodine, nitrogen, hydrogen, or boron. In certain embodiments, the pore walls contain graphene fluoride and the solid graphene foam contains a fluorine content from 0.01% to 15% by weight. In certain other embodiments, the pore walls contain graphene oxide and the solid graphene foam contains an oxygen content from 0.01% to 20% by weight.

In the porous anode material structure, the pore walls typically contain a 3D network of interconnected graphene planes. The foam may contain mesoscaled pores having a pore size from 2 nm to 100 nm, or may contain pores in the size range up to 100 μm but preferably smaller than 50 μm, and further preferably smaller than 10 μm.

The anode active material coating is preferably selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide; (f) prelithiated versions thereof; (g) particles of Li, Li alloy, or surface-stabilized Li having at least 60% by weight of lithium element therein; and (h) combinations thereof. The Li alloy typically contains from 0.1% to 10% by weight of a metal element selected from Zn, Ag, Au, Mg, Ni, Ti, Fe, Co, V, or a combination.

In the porous anode material structure, the coating of anode active material may be further coated with a layer of carbon or a conducting polymer. The carbon can be an amorphous carbon, chemical vapor deposition carbon, or a polymeric carbon (carbon derived from carbonized resin or pitch).

The present invention also provides a method of producing a porous anode material structure for a lithium-ion battery, the method comprising (A) providing an integral 3D graphene-carbon hybrid foam comprising multiple pores, having a pore volume Vp, and pore walls; and (B) impregnating or infiltrating the pores with a fluid for forming a coating of an anode active material, having a coating volume Vc, on surfaces of the pore walls; wherein the pore walls contain single-layer or few-layer graphene sheets chemically bonded by a carbon material having a carbon material-to-graphene weight ratio from 1/200 to 1/2, and wherein the volume ratio Vp/Vc is from 0.1/1.0 to 10/1.0.

Step (B) of impregnating or infiltrating said pores with a fluid may include an operation or procedure selected from chemical vapor deposition, physical vapor deposition, solution infiltration, melt infiltration, or a combination thereof.

Step (B) may be followed by a step of introducing a conducting polymer or carbon into the pores wherein the conducting polymer or carbon is deposited onto a surface of the coating of anode active material, providing protection thereto.

Figure 2A:
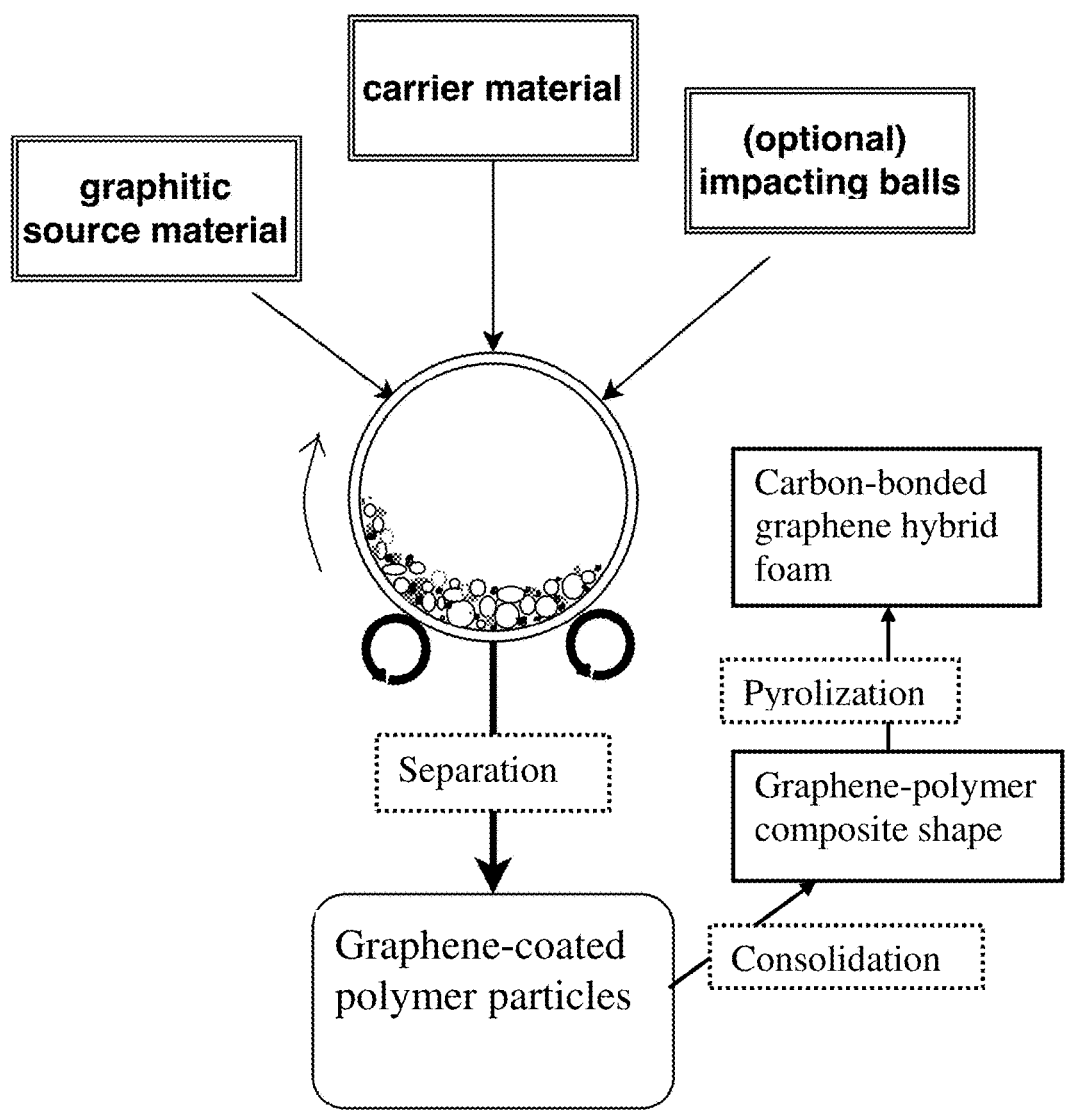
FIG. 2(A) A flow chart showing the presently invented process for producing integral 3D graphene-carbon hybrid foam.

For Step (A), the integral 3D graphene-carbon hybrid foam may be produced directly from particles of a graphitic material and particles of a polymer. This procedure of producing 3D graphene-carbon hybrid foam is stunningly simple, as discussed below:

As schematically illustrated in FIG. 2(A), the method begins with mixing multiple particles of a graphitic material and multiple particles of a solid polymer carrier material to form a mixture, which is enclosed in an impacting chamber of an energy impacting apparatus (e.g. a vibratory ball mill, planetary ball mill, high energy mill, basket mill, agitator ball mill, cryo ball mill, microball mill, tumbler ball mill, attritor, continuous ball mill, stirred ball mill, pressurized ball mill, freezer mill, vibratory sieve, bead mill, nanobead mill, ultrasonic homogenizer mill, centrifugal planetary mixer, vacuum ball mill, or resonant acoustic mixer). When in operation, this energy impacting device imparts kinetic energy to the solid particles contained therein, allowing polymer particles to impinge upon graphite particles with high intensity and high frequency.

In typical operational conditions, such impacting events result in peeling off of graphene sheets from the graphitic material and transferring the graphene sheets to surfaces of the solid polymer carrier particles. These graphene sheets wrap around polymer particles to form graphene-coated polymer particles inside the impacting chamber. This is herein referred to as the "direct transfer" process, meaning that graphene sheets are directly transferred from graphite particles to surfaces of polymer particles without being mediated by any third-party entities.

Alternatively, a plurality of impacting balls or media can be added to the impacting chamber of the energy impacting apparatus. These impacting balls, accelerated by the impacting apparatus, impinge upon the surfaces/edges of graphite particles with a high kinetic energy at a favorable angle to peel off graphene sheets from graphite particles. These graphene sheets are tentatively transferred to surfaces of these impacting balls. These graphene-supporting impacting balls subsequently collide with polymer particles and transfer the supported graphene sheets to the surfaces of these polymer particles. This sequence of events is herein referred to as the "indirect transfer" process. These events occur in very high frequency and, hence, most of the polymer particles are covered by graphene sheets typically in less than one hour. In some embodiments of the indirect transfer process, step (c) includes operating a magnet to separate the impacting balls or media from the graphene-coated or graphene-embedded polymer particles.

The method then includes recovering the graphene-coated or graphene-embedded polymer particles from the impacting chamber and consolidating the graphene-coated polymer particles into a desired shape of graphene-polymer composite structure. This consolidating step can be as simple as a compacting step that just mechanically packs graphene-coated or embedded particles into a desired shape. Alternatively, this consolidating step can entail melting the polymer particles to form a polymer matrix with graphene sheets dispersed therein. Such a graphene-polymer structure can be in any practical shape or dimensions (fiber, rod, plate, cylinder, layer, or any regular shape or odd shape).

The graphene-polymer compact or composite structure is then pyrolyzed to thermally convert the polymer into carbon or graphite that bonds the graphene sheets to form the integral 3D graphene-carbon hybrid foam.

Figure 2B:
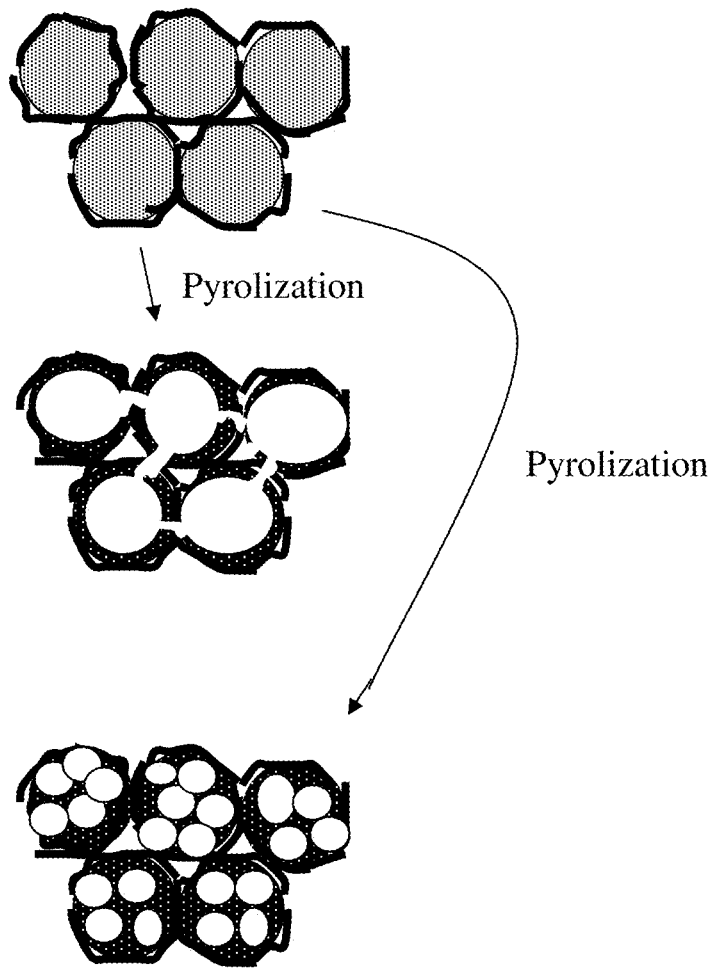
FIG. 2(B) Schematic of the heat-induced conversion of polymer into carbon, which bonds graphene sheets together to form a 3D graphene-carbon hybrid foam. The compacted structure of graphene-coated polymer particles is converted into a highly porous structure.
Figure 3A:
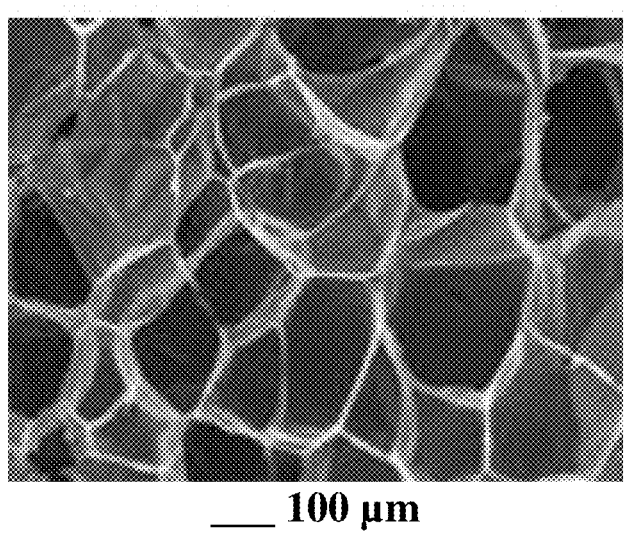
FIG. 3(A) An SEM image of an internal structure of a 3D graphene-carbon hybrid foam.
Figure 3B:
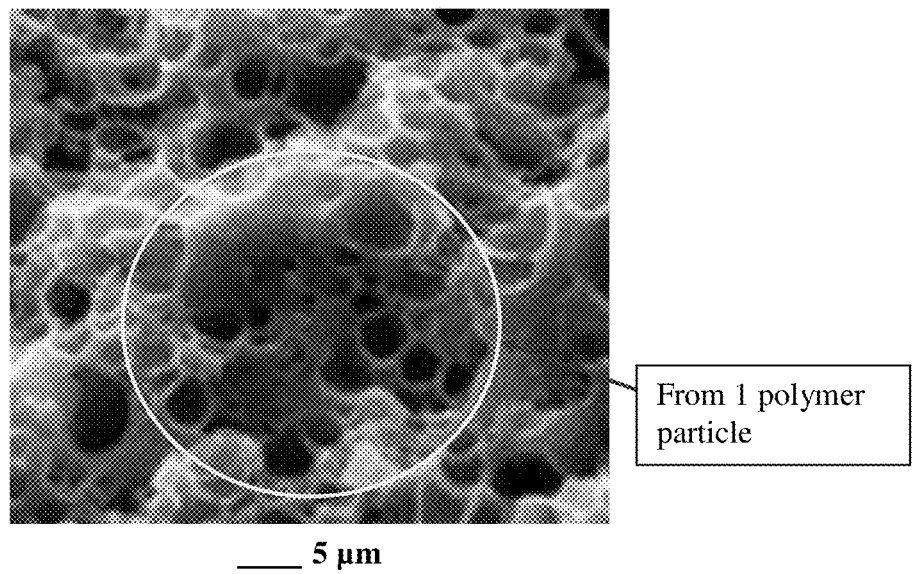
FIG. 3(B) An SEM image of an internal structure of another 3D graphene-carbon hybrid foam FIG. 4 The charge-discharge cycling behaviors of 2 lithium cells featuring graphene-carbon foam-supported Sb—Ge coating-based anodes (Sb 85%/Ge 15%): one cell containing graphene-embraced Sb—Ge particles tightly packed together (pore/anode solid ratio <0.1/1.0) and the other cell containing graphene-carbon foam-protected Sb—Ge coating (having a pore/anode solid volume ratio of 1.25/1.0).

For the formation of the carbon component of the resulting graphene-carbon hybrid foam, one can choose polymer particles that have a high carbon yield or char yield (e.g. >30% by weight of a polymer being converted to a solid carbon phase; instead of becoming part of a volatile gas). The high carbon-yield polymer may be selected from phenolic resin, poly furfuryl alcohol, polyacrylonitrile, polyimide, polyamide, polyoxadiazole, polybenzoxazole, polybenzobisoxazole, polythiazole, polybenzothiazole, polybenzobisthiazole, poly(p-phenylene vinylene), polybenzimidazole, polybenzobisimidazole, a copolymer thereof, a polymer blend thereof, or a combination thereof. When pyrolyzed, particles of these polymers become porous, as illustrated in the bottom portion of FIG. 2(B).

If a lower carbon content (higher graphene proportion relative to carbon proportion) and lower foam density are desired in the graphene-carbon hybrid foam, the polymer can contain a low carbon-yield polymer selected from polyethylene, polypropylene, polybutylene, polyvinyl chloride, polycarbonate, acrylonitrile-butadiene (ABS), polyester, polyvinyl alcohol, poly vinylidene fluoride (PVDF), polytetrafluoroethylene (PTFE), polyphenylene oxide (PPO), poly methyl methacrylate (PMMA), a copolymer thereof, a polymer blend thereof, or a combination thereof. When pyrolyzed, particles of these polymers become porous, as illustrated in the middle portion of FIG. 2(B).

These polymers (both high and low carbon yields), when heated at a temperature of 300-2,500° C., are converted into a carbon material, which is preferentially nucleated near graphene sheet edges. Such a carbon material naturally bridges the gaps between graphene sheets, forming interconnected electron-conducting pathways. In actuality, the resulting graphene-carbon hybrid foam is composed of integral 3D network of carbon-bonded graphene sheets, enabling continuous transport of electrons and phonons (quantized lattice vibrations) between graphene sheets or domains without interruptions. When further heated at a temperature higher than 2,500° C., the carbon phase can get graphitized to further increase both the electric conductivity and thermal conductivity. The amount of non-carbon elements is also decreased to typically below 1% by weight if the graphitization time exceeds 1 hour.

It may be noted that an organic polymer typically contains a significant amount of non-carbon elements, which can be reduced or eliminated via heat treatments. As such, pyrolyzation of a polymer causes the formation and evolution of volatile gas molecules, such as $CO_2$ and $H_2O$, which lead to the formation of pores in the resulting polymeric carbon phase. However, such pores also have a high tendency to get collapsed if the polymer is not constrained when being carbonized (the carbon structure can shrink while non-carbon elements are being released). We have surprising discovered that the graphene sheets wrapped around a polymer particle are capable of constraining the carbon pore walls from being collapsed. In the meantime, some carbon species also permeate to the gaps between graphene sheets where these species bond the graphene sheets together. The pore sizes and pore volume (porosity level) of the resulting 3D integral graphene foam mainly depend upon the starting polymer size and the carbon yield of the polymer.

The graphitic material, as a source of graphene sheets, may be selected from natural graphite, synthetic graphite, highly oriented pyrolytic graphite, graphite fiber, graphitic nanofiber, graphite fluoride, oxidized graphite, chemically modified graphite, exfoliated graphite, recompressed exfoliated graphite, expanded graphite, mesocarbon microbead, or a combination thereof. In this regard, there are several additional surprising elements associated with the presently invented method:
(1) Graphene sheets can be peeled off from natural graphite by using polymer particles alone, without utilizing the heavier and harder impacting balls (such as zirconium dioxide or steel balls commonly used in a ball mill, for instance). The peeled-off graphene sheets are directly transferred to polymer particle surfaces and are firmly wrapped around the polymer particles.
(2) It is also surprising that impacting polymer particles are capable of peeling off graphene sheets from artificial graphite, such as mesocarbon microbeads (MCMBs), which are known to have a skin layer of amorphous carbon.
(3) With the assistance of harder impacting balls, the graphene-like planes of carbon atoms constituting the internal structure of a carbon or graphite fiber can also be peeled off and transferred to the polymer particle surfaces. This has never been taught or suggested in prior art.
(4) The present invention provides a strikingly simple, fast, scalable, environmentally benign, and cost-effective process that avoids essentially all of the drawbacks associated with prior art processes of producing graphene sheets. The graphene sheets are immediately transferred to and wrapped around the polymer particles, which are then readily converted to integral 3D graphene-carbon hybrid foam.

If a high electrical or thermal conductivity is desired, the graphitic material may be selected from a non-intercalated and non-oxidized graphitic material that has never been previously exposed to a chemical or oxidation treatment prior to being placed into the impacting chamber. Alternatively or additionally, the graphene-carbon foam can be subjected to graphitization treatment at a temperature higher than 2,500° C. The resulting material is particularly useful for thermal management applications (e.g. for use to make a finned heat sink, a heat exchanger, or a heat spreader.

It may be noted that the graphene-carbon foam may be subjected to compression during and/or after the graphitization treatment. This operation enables us to adjust the graphene sheet orientation and the degree of porosity.

X-ray diffraction patterns were obtained with an X-ray diffractometer equipped with CuKcv radiation. The shift and broadening of diffraction peaks were calibrated using a silicon powder standard. The degree of graphitization, g, was calculated from the X-ray pattern using the Mering's Eq, $d_{002}=0.3354 g+0.344 (1-g)$, where $d_{002}$ is the interlayer spacing of graphite or graphene crystal in nm. This equation is valid only when $d_{002}$ is equal or less than approximately 0.3440 nm. The graphene foam walls having a $d_{002}$ higher than 0.3440 nm reflects the presence of oxygen- or fluorine-containing functional groups (such as —F, —OH, >O, and —COOH on graphene molecular plane surfaces or edges) that act as a spacer to increase the inter-graphene spacing.

Another structural index that can be used to characterize the degree of ordering of the stacked and bonded graphene planes in the foam walls of graphene and conventional graphite crystals is the "mosaic spread," which is expressed by the full width at half maximum of a rocking curve (X-ray diffraction intensity) of the (002) or (004) reflection. This degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Most of our graphene walls have a mosaic spread value in this range of 0.2-0.4 (if produced with a heat treatment temperature (HTT) no less than 2,500° C.). However, some values are in the range from 0.4-0.7 if the HTT is between 1,500 and 2,500° C., and in the range from 0.7-1.0 if the HTT is between 300 and 1,500° C.

In-depth studies using a combination of SEM, TEM, selected area diffraction, X-ray diffraction, AFM, Raman spectroscopy, and FUR indicate that the graphene foam walls are composed of several huge graphene planes (with length/width typically >>20 nm, more typically >>100 nm, often >>1 μm, and, in many cases, >>10 μm, or even >>100 μm). These giant graphene planes are stacked and bonded along the thickness direction (crystallographic c-axis direction) often through not just the van der Waals forces (as in conventional graphite crystallites), but also covalent bonds, if the final heat treatment temperature is lower than 2,500° C. In these cases, wishing not to be limited by theory, but Raman and FTIR spectroscopy studies appear to indicate the co-existence of $sp^2$ (dominating) and $sp^3$ (weak but existing) electronic configurations, not just the conventional $sp^2$ in graphite.

The integral 3D graphene-carbon hybrid foam is composed of multiple pores and pore walls, wherein the pore walls contain single-layer or few-layer graphene sheets chemically bonded by a carbon material having a carbon material-to-graphene weight ratio from 1/100 to 1/2, wherein the few-layer graphene sheets have 2-10 layers of stacked graphene planes having an inter-plane spacing $d_{002}$ from 0.3354 nm to 0.36 nm as measured by X-ray diffraction and the single-layer or few-layer graphene sheets contain a pristine graphene material having essentially zero % of non-carbon elements, or a non-pristine graphene material having 0.01% to 25% by weight of non-carbon elements (more typically <15%) wherein the non-pristine graphene is selected from graphene oxide, reduced graphene oxide, graphene fluoride, graphene chloride, graphene bromide, graphene iodide, hydrogenated graphene, nitrogenated graphene, chemically functionalized graphene, or a combination thereof. A plurality of single-layer or few layer graphene embracing the underlying polymer particles can overlap with one another to form a stack of graphene sheets. The stack can have a thickness greater than 5 nm and, in some cases, greater than 10 nm or even greater than 100 nm.

The integral 3D graphene-carbon hybrid foam typically has a density from 0.001 to 1.7 g/cm³, a specific surface area from 50 to 3,000 m²/g, a thermal conductivity of at least 200 W/mK per unit of specific gravity, and/or an electrical conductivity no less than 2,000 S/cm per unit of specific gravity. In a preferred embodiment, the pore walls contain stacked graphene planes having an inter-planar spacing $d_{002}$ from 0.3354 nm to 0.40 nm as measured by X-ray diffraction.

Many of the graphene sheets can be merged edge to edge through covalent bonds with one another, into an integrated graphene entity. The gaps between the free ends of those unmerged sheets or shorter merged sheets are bonded by the carbon phase converted from a polymer. Due to these unique chemical composition (including oxygen or fluorine content, etc.), morphology, crystal structure (including inter-graphene spacing), and structural features (e.g. degree of orientations, few defects, chemical bonding and no gap between graphene sheets, and substantially no interruptions along graphene plane directions), the graphene-carbon hybrid foam has a unique combination of outstanding thermal conductivity, electrical conductivity, mechanical strength, and stiffness (elastic modulus).

After the 3D graphene-carbon hybrid foam is made, the pores may be impregnated or infiltrated with a fluid, which is converted to anode active material coating bonded to surfaces of pore walls. This can be accomplished by using an operation such as chemical vapor deposition, physical vapor deposition, solution infiltration, melt infiltration, chemical plating, electrochemical deposition, chemical reaction precipitation, or a combination thereof.

For instance, one may introduce a Si source gas (e.g. silane, SiH₄) into the pores of a graphene-carbon foam structure at a temperature from 430° C. to 1,050° C. Polycrystalline silicon may be deposited from trichlorosilane (SiHCl₃) or silane (SiH₄), following the following reactions:

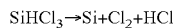

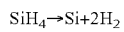

This latter reaction may be performed in low-pressure chemical vapor deposition (LPCVD) systems, with either pure silane feedstock, or a solution of silane with 70-80% nitrogen. Temperatures between 600 and 650° C. and pressures between 25 and 150 Pa yield a Si coating growth rate between 10 and 20 nm per minute. An alternative process makes use of a hydrogen-silane mixture; the hydrogen reducing the growth rate, but the temperature may be raised to 850 or even 1050° C. to compensate for this rate reduction. Once a layer of CVD Si coating is deposited onto pore wall surfaces, the Si coating may be deposited with a thin layer of CVD carbon or polymeric carbon coating (resin coating that is subsequently carbonized).

Tin oxide coatings can be prepared by physical vapor deposition (PVD) of Sn into the pores of the graphene-carbon foam, followed by thermal oxidation. Alternatively, $SnCl_4 \cdot 5H_2O$ mixed with $CH_3OH$ in a solution state may be impregnated into pores of the graphene-carbon foam. Upon removal of the liquid component, the graphene foam structure containing the reactants coated on pore walls may be subjected to pyrolysis to obtain $SnO_2$ coatings.

The procedure of fluid infiltration or impregnation is conducted in such a manner that the pore volume/coating volume ratio Vp/Vc is from 0.1/1.0 to 10/1.0, preferably from 0.3/1.0 to 4.0/1.0, and further preferably from 0.5/1.0 to 3.8/1.0. The coating bonded to the pore walls should only fill the pores to the extent that Vp/Vc is from 0.1/1.0 to 10/1.0.

The following examples are used to illustrate some specific details about the best modes of practicing the instant invention and should not be construed as limiting the scope of the invention.

Example 1: Production of Graphene-Carbon Foam from Flake Graphite Via Polypropylene Powder-Based Solid Polymer Carrier In an experiment, 1 kg of polypropylene (PP) pellets, 50 grams of flake graphite, 50 mesh (average particle size 0.18 mm; Asbury Carbons, Asbury N.J.) and 250 grams of magnetic steel balls were placed in a high-energy ball mill container. The ball mill was operated at 300 rpm for 2 hours. The container lid was removed and stainless steel balls were removed via a magnet. The polymer carrier material was found to be coated with a dark graphene layer. Carrier material was placed over a 50 mesh sieve and a small amount of unprocessed flake graphite was removed.

A sample of the coated carrier material was then immersed in tetrachloroethylene at 80° C. for 24 hours to dissolve PP and allow graphene sheets to disperse in the organic solvent. After solvent removal, isolated graphene sheet powder was recovered (mostly few-layer graphene). The remaining coated carrier material was then compacted in a mold cavity to form a green compact, which was then heat-treated in a sealed crucible at 350° C. and then at 600° C. for 2 hours to produce a graphene-carbon foam.

In a separate experiment, the same batch of PP pellets and flake graphite particles (without the impacting steel balls) were placed in the same high-energy ball mill container and the ball mill was operated under the same conditions for the same period of time. The results were compared with those obtained from impacting ball-assisted operation. The isolated graphene sheets isolated from PP particles, upon PP dissolution, are mostly single-layer graphene. The graphene-carbon foam produced from this process has a higher level of porosity (lower physical density).

Although polypropylene (PP) is herein used as an example, the carrier material for graphene-carbon hybrid foam production is not limited to PP. It could be any polymer (thermoplastic, thermoset, rubber, wax, mastic, gum, organic resin, etc.) provided the polymer can be made into a particulate form. It may be noted that un-cured or partially cured thermosetting resins (such as epoxide and imide-based oligomers or rubber) can be made into a particle form at room temperature or lower (e.g. cryogenic temperature). Hence, even partially cured thermosetting resin particles can be used as a polymer carrier.

Several 3D integral graphene-carbon foam structures were then infiltrated with a mixture gas of silane with 70% nitrogen at 650° C. and a pressure of 50 Pa for 1-30 minutes to produce graphene-carbon foam structures, containing Si coating deposited therein on pore walls and having a wide range of pore/coating volume ratios, from approximately 0.22/1.0 to 5.8/1.0.

Example 2: Graphene-Carbon Hybrid Foam Using Expanded Graphite (>100 nm in Thickness) as the Graphene Source and ABS as the Polymer Solid Carrier Particles In an experiment, 100 grams of ABS pellets, as solid carrier material particles, were placed in a 16 oz plastic container along with 5 grams of expanded graphite. This container was placed in an acoustic mixing unit (Resodyn Acoustic mixer) and processed for 30 minutes. After processing, carrier material was found to be coated with a thin layer of carbon. A small sample of carrier material was placed in acetone and subjected to ultrasound energy to speed dissolution of the ABS. The solution was filtered using an appropriate filter and washed four times with additional acetone. Subsequent to washing, filtrate was dried in a vacuum oven set at 60° C. for 2 hours. This sample was examined by optical microscopy and found to be graphene. The remaining pellets were extruded to create graphene-polymer sheets (1 mm thick), which were then carbonized to prepare graphene-carbon foam samples under different temperature and compression conditions. The foam structures were then infiltrated with Sn coating to several different thicknesses using physical vapor deposition.

Example 3: Production of Graphene-Carbon Hybrid Foam from Mesocarbon Microbeads (MCMBs as the Graphene Source Material) and Polyacrylonitrile (PAN) Fibers (as Solid Carrier Particles)

In one example, 100 grams of PAN fiber segments (2 mm long as the carrier particles), 5 grams of MCMBs (China Steel Chemical Co., Taiwan), and 50 grams of zirconia beads were placed in a vibratory ball mill and processed for 2 hours. After the process was completed, the vibratory mill was then opened and the carrier material was found to be coated with a dark coating of graphene sheets. The zirconia particles, having distinctly different sizes and colors were manually removed. The graphene-coated PAN fibers were then compacted and melted together to form several composite films. The films were subjected to a heat treatment at 250° C. for 1 hour (in room air), 350° C. for 2 hours, and 1,000° C. for 2 hours (under an argon gas atmosphere) to obtain graphene-carbon foam layers. Half of the carbonized foam layers were then heated to 2,850° C. and maintained at this temperature for 0.5 hours. Several graphene-carbon foam structures were then electrochemically deposited with Zn on wall surfaces.

Example 4: Particles of Cured Phenolic Resin as the Polymer Carrier in an Attritor Mill In one experiment, 10 grams of phenolic resin particles were placed in an attritor mill sample holder along with 0.25 grams of HOPG powder derived from graphitized polyimide and a magnetic stainless steel impactor. The same experiment was performed, but the sample holder did not contain any impactor balls. These processes were carried out in a 1%-humidity "dry room" to reduce the condensation of water onto the completed product. The mill was operated for 10-120 minutes. After operation, the contents of the sample holder were sorted to recover graphene-coated resin particles by removing residual HOPG powder and impactor balls (when used).

The resulting graphene-coated resin particles in both cases (with or without impactor balls) were examined using both digital optical microscopy and scanning electron microscopy (SEM). It was observed that the thickness of the graphene sheets wrapped around resin particles increases with the milling operation time and, given the same duration of operation, the impactor-assisted operation leads to thicker graphene coating.

A mass of graphene-coated resin particles was compressed to form a green compact, which was then infiltrated with a small amount of petroleum pitch. Separately, another green compact of graphene-coated resin particles was prepared under comparable conditions, but no pitch infiltration was attempted. The two compacts were then subjected to identical pyrolysis treatments to obtain graphene-carbon hybrid foam structures, which were then infiltrated with Ge coating using cyclic germylene as a precursor in a CVD chamber at 320° C. according the procedure proposed by S. Veprek, et al. ["Organometallic Chemical Vapor Deposition of Germanium from a Cyclic Germylene, 1,3-Di-tert-butyl-1,3,2-diazagermolidin-2-ylidine," *Chem. Mater.*, 1996, 8 (4), pp 825-831; DOI: 10.1021/cm9503801].

Example 5: Natural Graphite Particles as the Graphene Source, Polyethylene (PE) or Nylon 6/6 Beads as the Solid Carrier Particles, and Ceramic or Glass Beads as Added Impacting Balls In an experiment, 0.5 kg of PE or nylon beads (as a solid carrier material), 50 grams of natural graphite (source of graphene sheets) and 250 grams of zirconia powder (impacting balls) were placed in containers of a planetary ball mill. The ball mill was operated at 300 rpm for 4 hours. The container lid was removed and zirconia beads (different sizes and weights than graphene-coated PE beads) were removed through a vibratory screen. The polymer carrier material particles were found to be coated with a dark graphene layer. Carrier material was placed over a 50 mesh sieve and a small amount of unprocessed flake graphite was removed. In a separate experiment, glass beads were used as the impacting balls; other ball-milling operation conditions remained the same.

A mass of graphene-coated PE pellets and a mass of graphene-coated nylon beads were separately compacted in a mold cavity and briefly heated above the melting point of PE or nylon and then rapidly cooled to form two green compacts. For comparison purposes, two corresponding compacts were prepared from a mass of un-coated PE pellets and a mass of un-coated nylon beads. These 4 compacts were then subjected to pyrolyzation (by heating the compacts in a chamber from 100° C. to 650° C.). The results were very surprising. The compacts of graphene-coated polymer particles were found to be converted to graphene-carbon hybrid foam structures having dimensions comparable to the dimensions of the original compacts (3 cm×3 cm×0.5 cm). SEM examination of these structures indicates that carbon phases are present near the edges of graphene sheets and these carbon phases act to bond the graphene sheets together. The carbon-bonded graphene sheets form a skeleton of graphene-carbon hybrid pore walls having pores being present in what used to be the space occupied by the original polymer particles, as schematically illustrated in FIG. 2(A).

In contrast, the two compacts from un-coated pellets or beads shrank to become essentially two solid masses of carbon having a volume approximately 15%-20% of the original compact volumes. These highly shrunk solid masses are practically pore-free carbon materials; they are not a foam material.

The highly porous graphene-carbon foam structures were then infiltrated with Sn using physical vapor deposition, followed by oxidation of the Sn coating to obtain $SnO_2$ coating bonded to pore wall surfaces.

Examples 6: Micron-Sized Rubber Particles as the Solid Polymer Carrier Particles The experiment began with preparation of micron-sized rubber particles. A mixture of methylhydro dimethyl-siloxane polymer (20 g) and polydimethylsiloxane, vinyldimethyl terminated polymer (30 g) was obtained by using a homogenizer under ambient conditions for 1 minute. Tween 80 (4.6 g) was added and the mixture was homogenized for 20 seconds. Platinum-divinyltetramethyldisiloxane complex (0.5 g in 15 g methanol) was added and mixed for 10 seconds. This mixture was added to 350 g of distilled water and a stable latex was obtained by homogenization for 15 minutes. The latex was heated to 60° C. for 15 hours. The latex was then de-emulsified with anhydrous sodium sulfate (20 g) and the silicone rubber particles were obtained by filtration under a vacuum, washing with distilled water, and drying under vacuum at 25° C. The particle size distribution of the resulting rubber particles was 3-11 µm.

In one example, 10 grams of rubber particles, 2 grams of natural graphite, and 5 grams of zirconia beads were placed in a vibratory ball mill and processed for 2 hours. After the process was completed, the vibratory mill was then opened and the rubber particles were found to be coated with a dark coating of graphene sheets. The zirconia particles were manually removed. The graphene-coated rubber particles were then mixed with 5% by wt. of petroleum pitch (as a binder) and mechanically compacted together to form several composite sheets. The composite sheets were then subjected to a heat treatment at 350° C. for 1 hour, 650° C. for 2 hours, and 1,000° C. for 1 hour in a tube furnace to obtain graphene-carbon foam layers. The layers of graphene-carbon foam were then impregnated with aqueous aluminum sulfate solution, dried, and heat-treated in the presence of $H_2/N_2$ gas mixture to convert the coated aluminum sulfate into aluminum metal coating bonded to pore walls.

On a separate basis, several graphene-carbon hybrid foam structures were infiltrated with Ge—Sb coating bonded to pore wall surfaces. The reactive gas, 6% $H_2$ balanced with argon gas (6% $H_2$/Ar), and the carrier argon gases for $GeCl_4$ and $SbCl_5$ are delivered through mass flow controllers at flow rates in the range from 50 mL/min-250 mL/min. The reaction temperature was set at a fixed temperature between 750° C. and 875° C. with the temperature determining the ratios between Ge and Sb in the coating formation. The Ge—Sb thin coatings with tuneable compositions can be achieved by changing the flow rates of reactive gas and carrier gases of precursors or the reaction temperatures. In one experiment, fixed gas flow rates of $GeCl_4$, $SbCl_5$, and 6% $H_2$/Ar of 50 mL/min, 150 mL/min, and 200 mL/min, respectively, were used. By simply changing the reaction temperature, the ratio of Ge to Sb in the deposited Ge—Sb coating can be varied. In this process, Sb served as the host material and Ge as the dopant in the Ge—Sb thin coatings. In this situation, the higher the temperature of the CVD reaction, the greater the content of germanium incorporated in the Ge—Sb thin film. Both Ge and Sb are known high-capacity anode active materials for lithium-ion batteries.

Examples 7: Preparation of Graphene Fluoride Foams

In a typical procedure, a sheet of graphene-carbon hybrid was fluorinated by vapors of chlorine trifluoride in a sealed autoclave reactor to yield fluorinated graphene-carbon hybrid film. Different durations of fluorination time were allowed for achieving different degrees of fluorination.

Example 8: Preparation of Graphene Oxide Foam and Nitrogenated Graphene Foams Several pieces of graphene-carbon foam prepared in Example 3 were immersed in a 30% $H_2O_2$-water solution for a period of 2-48 hours to obtain graphene oxide (GO) foams, having an oxygen content of 2-25% by weight.

Some GO foam samples were mixed with different proportions of urea and the mixtures were heated in a microwave reactor (900 W) for 0.5 to 5 minutes. The products were washed several times with deionized water and vacuum dried. The products obtained were nitrogenated graphene foam. The nitrogen contents were from 3 wt. % to 17.5 wt. %, as measured by elemental analysis.

Example 8: Preparation and Electrochemical Testing of Various Battery Cells

For most of the anode and cathode active materials investigated, we prepared lithium-ion cells or lithium metal cells using the conventional slurry coating method. A typical anode composition includes 85 wt. % active material (e.g., graphene-encapsulated, carbon foam-protected Si or $Co_3O_4$ particles), 7 wt. % acetylene black (Super-P), and 8 wt. % polyvinylidene fluoride binder (PVDF, 5 wt. % solid content) dissolved in N-methyl-2-pyrrolidinoe (NMP). After coating the slurries on Cu foil, the electrodes were dried at 120° C. in vacuum for 2 h to remove the solvent. Cathode layers are made in a similar manner (using Al foil as the cathode current collector) using the conventional slurry coating and drying procedures. An anode layer, separator layer (e.g. Celgard 2400 membrane), and a cathode layer are then laminated together and housed in a plastic-Al envelop. The cell is then injected with 1 M $LiPF_6$ electrolyte solution dissolved in a mixture of ethylene carbonate (EC) and diethyl carbonate (DEC) (EC-DEC, 1:1 v/v). In some cells, ionic liquids were used as the liquid electrolyte. The cell assemblies were made in an argon-filled glove-box.

The cyclic voltammetry (CV) measurements were carried out using an Arbin electrochemical workstation at a typical scanning rate of 1 mV/s. In addition, the electrochemical performances of various cells were also evaluated by galvanostatic charge/discharge cycling at a current density of from 50 mA/g to 10 A/g. For long-term cycling tests, multi-channel battery testers manufactured by LAND were used.

In lithium-ion battery industry, it is a common practice to define the cycle life of a battery as the number of charge-discharge cycles that the battery suffers 20% decay in capacity based on the initial capacity measured after the required electrochemical formation.

Figure 4:
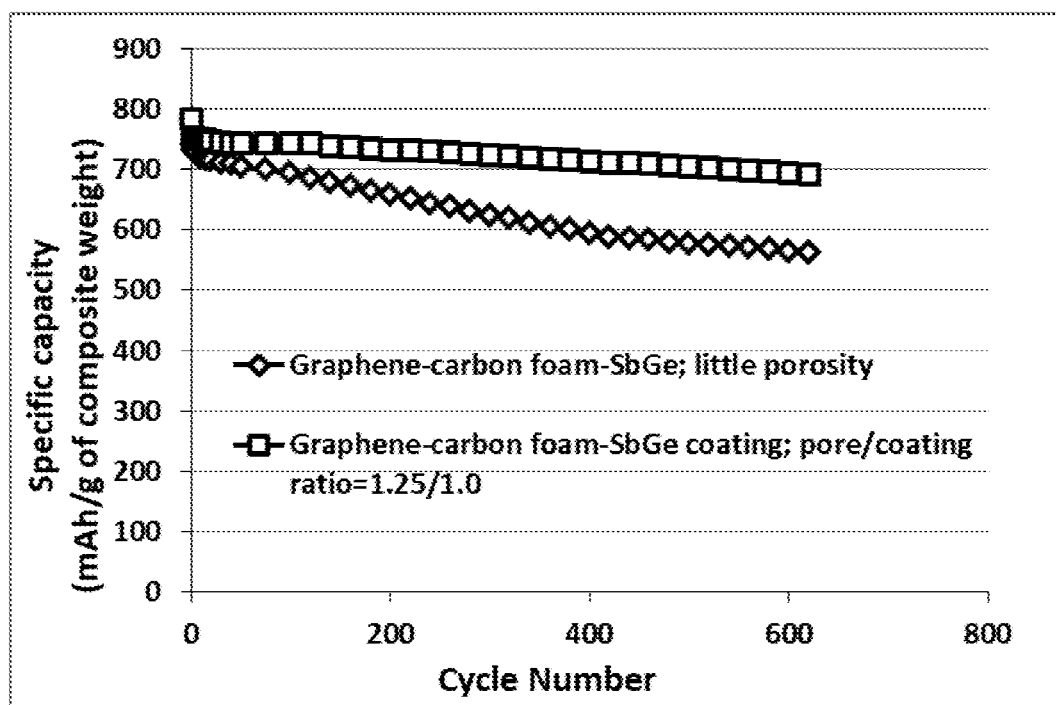

FIG. 4 shows the charge-discharge cycling behaviors of 2 lithium cells featuring graphene-carbon foam-supported Sb—Ge coating-based anodes (Sb 85%/Ge 15%): one cell containing graphene-embraced Sb—Ge particles tightly packed together (pore/anode solid ratio <0.1/1.0) and the other cell containing graphene-carbon foam-protected Sb—Ge coating (having a pore/anode solid volume ratio of 1.25/1.0). It is clear that the presently invented chemical-free production method leads to graphene-carbon foam-protected Sb—Ge coating that exhibits significantly more stable battery cycle behavior. The cell containing graphene-carbon Sb—Ge particles (having little porosity) has a cycle life of approximately 300 cycles, at which the capacity suffers a 20% decay. In contrast, the cell featuring the graphene-encapsulated, carbon foam-protected Sb—Ge coating prepared according to the instant invention experiences only a 11.62% reduction in capacity after 620 cycles. Thus, the cycle life is expected to exceed 1,000 cycles. We have further observed that, in general, a higher pore-to-anode active material ratio leads to a longer cycle life until when the ratio reaches approximately 2.1/1.0 for the Sb—Ge-based electrode.

Figure 5:
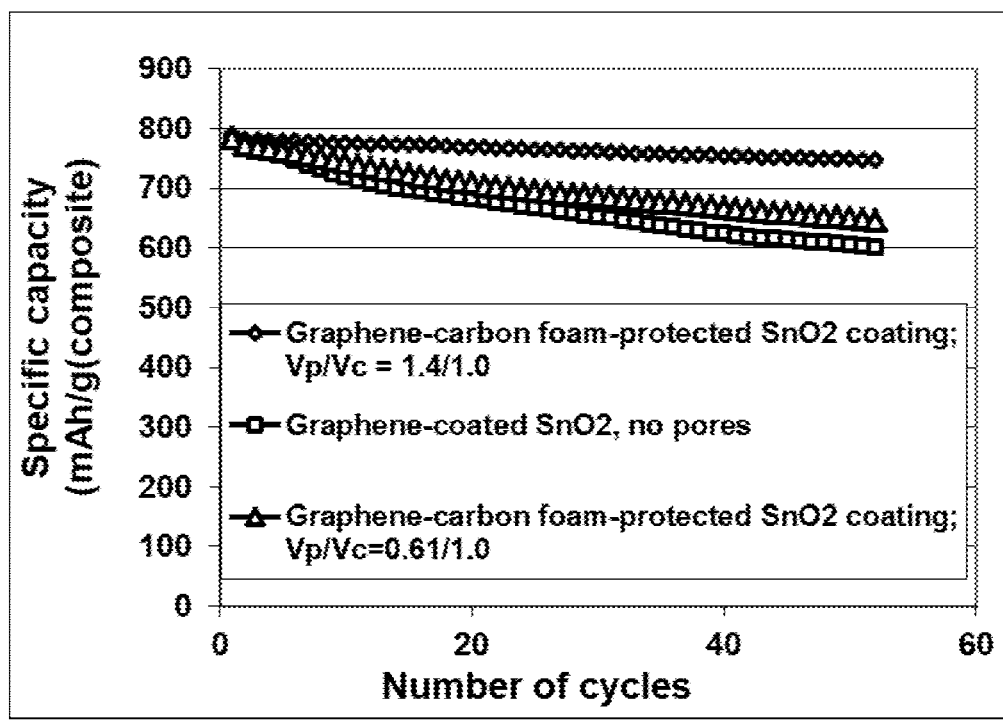
FIG. 5 The charge-discharge cycling behaviors (specific capacity) of 3 lithium-ion cells each having $SnO_2$ particles or coating as the an anode active material: one cell featuring graphene-encapsulated $SnO_2$ particles having no pores between encapsulating graphene sheets and $SnO_2$ particles; second cell having a graphene-carbon foam-supported $SnO_2$ coating with a pore-to-$SnO_2$ volume ration of 0.61/1.0; third cell having a graphene-carbon foam-supported $SnO_2$ coating with a pore-to-$SnO_2$ volume ration of 1.4/1.0.

Shown in FIG. 5 are the charge-discharge cycling behaviors (specific capacity) of 3 lithium-ion cells each having $SnO_2$ particles or coating as the an anode active material: one cell featuring graphene-encapsulated $SnO_2$ particles having no pores between encapsulating graphene sheets and $SnO_2$ particles; second cell having a graphene-carbon foam-supported $SnO_2$ coating with a pore-to-$SnO_2$ volume ration of 0.61/1.0; third cell having a graphene-carbon foam-supported $SnO_2$ coating with a pore-to-$SnO_2$ volume ration of 1.4/1.0. The presently invented strategy of implementing not only embracing graphene sheets but also carbon foam connecting the graphene sheets and the anode active material particles imparts a much stable cycle life to a lithium-ion battery. Again, a higher pore-to-anode active material ratio leads to a longer cycle life until when the ratio reaches approximately 2.2/1.0 for the $SnO_2$ particle-based anode.

Figure 6:
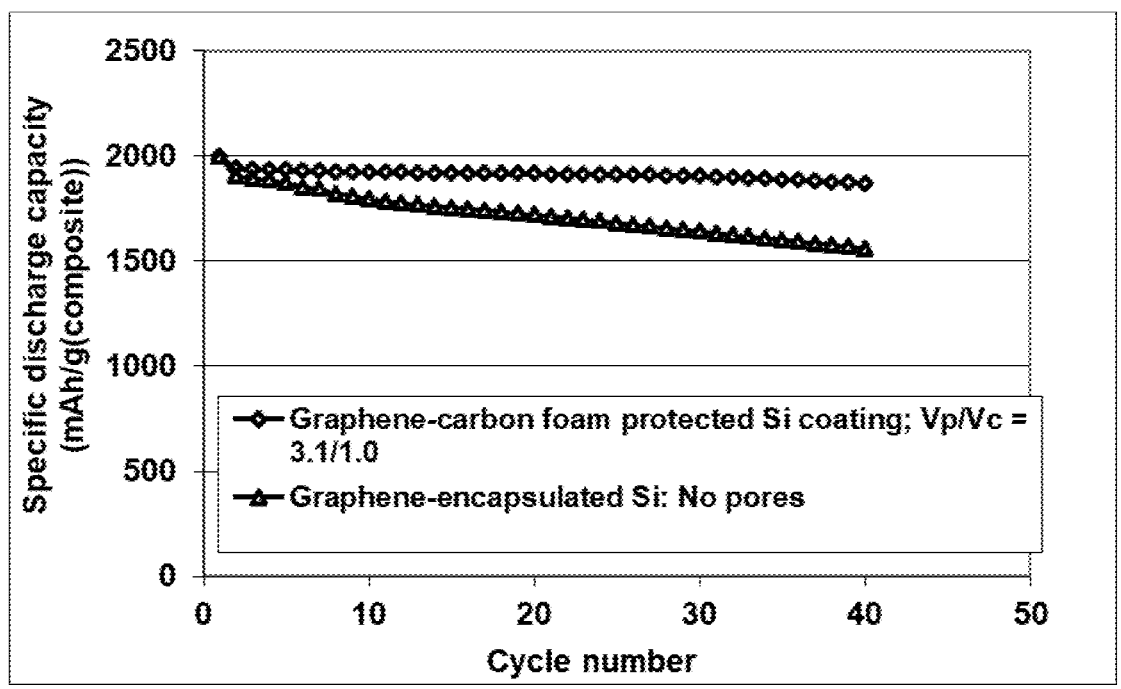
FIG. 6 The charge-discharge cycling behaviors of 2 lithium-ion cells: one cell containing graphene-embraced Si particles produced by the indirect transfer method (with externally added milling media, $ZrO_2$ balls) but little porosity, and the other cell containing graphene-carbon foam protected CVD Si coating as the anode active material. The pore-to-Si volume ratio is approximately 3.1/1.0.

Shown in FIG. 6 are the charge-discharge cycling behaviors of 2 lithium-ion cells: one cell containing graphene-embraced Si particles produced by the indirect transfer method (with externally added milling media, $ZrO_2$ balls) but little porosity, and the other cell containing graphene-carbon foam protected CVD Si coating as the anode active material. The pore-to-Si volume ratio is approximately 3.1/1.0. Again, the invented strategy leads to very stable cycling behavior.

Figure 7:
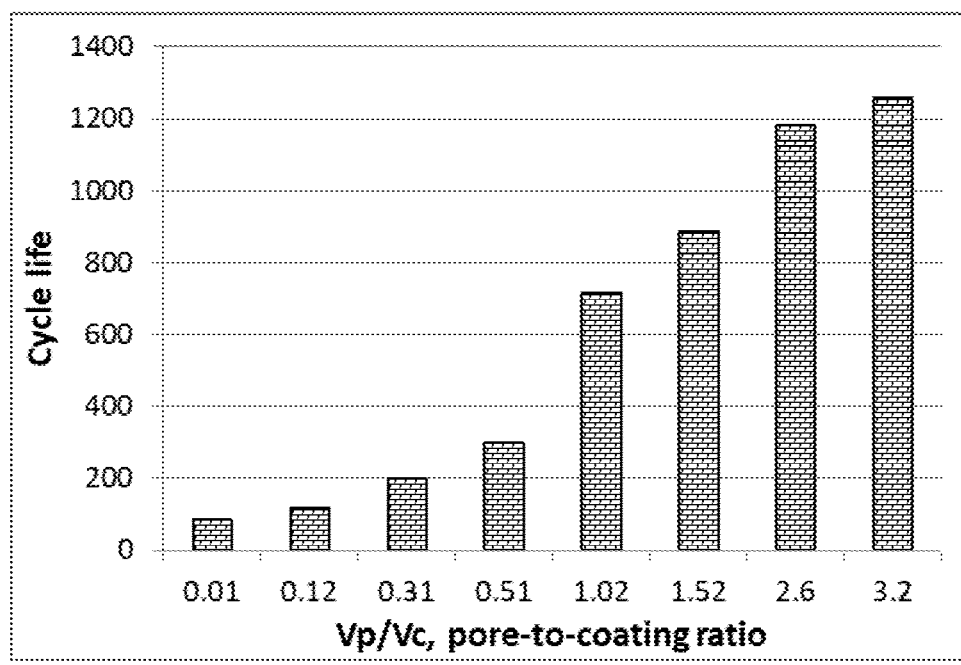
FIG. 7 The cycle life data of lithium-ion cells containing graphene-carbon foam-protected Si coatings, plotted as a function of the pore-to-coating ratio in the 3D graphene-carbon hybrid foam.

Example 9: The Effects of the Total Pore-to-Solid Anode Active Material Ratio on the Charge/Discharge Cycle Life of a Lithium Battery The effects of the total pore-to-solid anode active material ratio in the invented graphene-carbon hybrid foam-supported coatings may be illustrated in FIG. 7. FIG. 7 shows the cycle life data of lithium-ion cells containing graphene-carbon foam-protected Si coatings, plotted as a function of the total pore-to-coating ratio in the 3D graphene-carbon hybrid foam. These data have demonstrated the significance of the pore volume in impacting the cycle life of a lithium battery. Typically, in all lithium-ion batteries containing the presently invented hybrid graphene foam-protected anode coatings, there is a threshold pore volume-to-coating volume ratio above which a dramatic increase in cycle life is observed.

I claim:

1. A porous anode material structure for a lithium-ion battery, said structure comprising (A) an integral 3D graphene-carbon hybrid foam comprising multiple pores, having a pore volume Vp, and pore walls; and (B) coating of an anode active material, having a coating volume Vc, coated on surfaces of said pore walls; wherein said pore walls contain single-layer or few-layer graphene sheets chemically bonded by a carbon material having a carbon material-to-graphene weight ratio from 1/200 to 1/2, and wherein the volume ratio Vp/Vc is from 0.1/1.0 to 10/1.0, wherein said porous anode material structure includes porous particulates having multiple pores and pore walls coated with said coating, and said porous particulates have a diameter from 5 μm to 50 μm.

2. The porous anode material structure of claim 1, wherein said few-layer graphene sheets have 2-10 layers of stacked graphene planes having an inter-plane spacing $d_{002}$ from 0.3354 nm to 0.40 nm as measured by X-ray diffraction and said single-layer or few-layer graphene sheets contain a pristine graphene material having essentially zero % of non-carbon elements, or a non-pristine graphene material having 0.001% to 25% by weight of non-carbon elements wherein said non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

3. The porous anode material structure of claim 1, wherein said volume ratio Vp/Vc is from 0.3/1.0 to 4.0/1.0.

4. The porous anode material structure of claim 1, wherein said integral 3D graphene-carbon hybrid foam contains multiple pores that are interconnected to form open cells for accommodating an entry of said coating.

5. The porous anode material structure of claim 1, wherein said pore walls contain a non-pristine graphene material and wherein said foam contains a content of non-carbon elements in the range from 0.01% to 20% by weight and said non-carbon elements include an element selected from oxygen, fluorine, chlorine, bromine, iodine, nitrogen, hydrogen, or boron.

6. The porous anode material structure of claim 1, wherein said pore walls contain graphene fluoride and said 3D graphene-carbon hybrid foam contains a fluorine content from 0.01% to 15% by weight.

7. The porous anode material structure of claim 1, wherein said pore walls contain graphene oxide and said 3D graphene-carbon hybrid foam contains an oxygen content from 0.01% to 20% by weight.

8. The porous anode material structure of claim 1, wherein said pore walls contain a 3D network of interconnected graphene planes.

9. The porous anode material structure of claim 1, wherein said anode active material coating is selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e)

lithium aluminate, lithium-containing titanium oxide, lithium transition metal oxide; (f) prelithiated versions thereof; (g) particles of Li, Li alloy, or surface-stabilized Li having at least 60% by weight of lithium element therein; and (h) combinations thereof.

10. The porous anode material structure of claim 9, wherein said Li alloy contains from 0.1% to 10% by weight of a metal element selected from Zn, Ag, Au, Mg, Ni, Ti, Fe, Co, V, or a combination.

11. The porous anode material structure of claim 1, wherein said anode active material contains a prelithiated Si, prelithiated Ge, prelithiated Sn, prelithiated $SnO_x$, prelithiated $SiO_x$, prelithiated iron oxide, prelithiated $VO_2$, prelithiated $Co_3O_4$, prelithiated $Ni_3O_4$, lithium titanate, or a combination thereof, wherein x=1 to 2.

12. The porous anode material structure of claim 1, wherein said coating of anode active material is further coated with a layer of carbon or conducting polymer.

\* \* \* \* \*